(12) United States Patent
Han et al.

(10) Patent No.: US 11,842,673 B2
(45) Date of Patent: Dec. 12, 2023

(54) CONTROL METHOD AND SYSTEM FOR DISPLAY SWITCHING, ELECTRONIC DEVICE AND STORAGE MEDIUM

(71) Applicants: Beijing BOE Optoelectronics Technology Co., Ltd., Beijing (CN); BOE Technology Group Co., Ltd., Beijing (CN)

(72) Inventors: Peng Han, Beijing (CN); Hao Zhang, Beijing (CN); Lili Chen, Beijing (CN); Huidong He, Beijing (CN); Juanjuan Shi, Beijing (CN); Qianwen Jiang, Beijing (CN); Weihua Du, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 91 days.

(21) Appl. No.: 17/511,388

(22) Filed: Oct. 26, 2021

(65) Prior Publication Data
US 2022/0130320 A1    Apr. 28, 2022

(30) Foreign Application Priority Data
Oct. 27, 2020    (CN) .......................... 202011164385.7

(51) Int. Cl.
G09G 3/22    (2006.01)
G06F 9/54    (2006.01)
G09G 5/00    (2006.01)

(52) U.S. Cl.
CPC ............... *G09G 3/22* (2013.01); *G06F 9/544* (2013.01); *G09G 5/006* (2013.01); *G09G 2310/0291* (2013.01); *G09G 2340/0407* (2013.01); *G09G 2360/18* (2013.01)

(58) Field of Classification Search
None
See application file for complete search history.

(56) References Cited

U.S. PATENT DOCUMENTS

2003/0140179 A1* 7/2003 Wilt .................... G06F 9/4843
719/321
2009/0225088 A1* 9/2009 Aoki .................... G09G 5/399
345/501

(Continued)

*Primary Examiner* — James A Thompson
*Assistant Examiner* — Kim Thanh T Tran
(74) *Attorney, Agent, or Firm* — IPro, PLLC

(57) ABSTRACT

A control method for display switching, an electronic device, and a storage medium are provided. The control method for display switching includes: establishing a first buffer and a second buffer at a kernel layer and initializing the first buffer; establishing a first service process and a second service process at a user layer, and controlling the first service process to render a first image according to a display parameter of a first buffer and transmit it to a display screen via the first buffer for display; and initializing the second buffer according to a switching instruction, and controlling the second service process to render a second image according to a display parameter of the second buffer and transmit it to the display screen via the second buffer so as to make the display screen switch to displaying the second image.

17 Claims, 7 Drawing Sheets

(56) References Cited

U.S. PATENT DOCUMENTS

| | | | |
|---|---|---|---|
| 2013/0021354 A1* | 1/2013 | Van Eerd | G09G 5/399 |
| | | | 345/531 |
| 2014/0156783 A1* | 6/2014 | Matthews | H04L 67/10 |
| | | | 709/217 |
| 2019/0043448 A1* | 2/2019 | Thakur | G09G 5/001 |
| 2019/0297309 A1* | 9/2019 | Chiu | H04N 9/312 |
| 2020/0043150 A1* | 2/2020 | Yuan | G06T 5/009 |
| 2021/0281771 A1* | 9/2021 | Yang | H04N 5/772 |

* cited by examiner

CONTROL METHOD AND SYSTEM FOR DISPLAY SWITCHING, ELECTRONIC DEVICE AND STORAGE MEDIUM

CROSS-REFERENCE TO RELATED APPLICATIONS

This application claims priority to Chinese Patent Application No. 202011164385.7 filed in China on Oct. 27, 2020, which is incorporated in its entirety by reference herein.

TECHNICAL FIELD

The present disclosure relates to the field of display control technology, and in particularly to a control method for display switching, a control system for display switching, an electronic device, and a storage medium.

BACKGROUND

In the related technologies, display definition of electronic products becomes higher and higher, and a series of high-definition displays such as 4 k and 8 k come out successively. In particular, high-definition pictures in virtual reality (VR) technology can provide a good experience for people.

SUMMARY

Embodiments of the present disclosure provide a control method for display switching, a control system for display switching, an electronic device, and a storage medium.

A control method for display switching provided by embodiments of the present disclosure includes: establishing a first buffer and a second buffer at a kernel layer and initializing the first buffer; establishing a first service process and a second service process at a user layer, and controlling the first service process to render a first image according to a display parameter of the first buffer and transmit the rendered first image to a display screen via the first buffer for display; and initializing the second buffer according to a switching instruction, and controlling the second service process to render a second image according to a display parameter of the second buffer and transmit the rendered second image to the display screen via the second buffer so as to make the display screen switch to displaying the second image.

In some embodiments, the establishing the first service process and the second service process at the user layer, and controlling the first service process to render the first image according to the display parameter of the first buffer and transmit the rendered first image to the display screen via the first buffer for display includes: starting a process management center; controlling the process management center to create the first service process and the second service process; and controlling the process management center to create a broadcast communication interface process to obtain the display parameter.

In some embodiments, the establishing the first service process and the second service process at the user layer, and controlling the first service process to render the first image according to the display parameter of the first buffer and transmit the rendered first image to the display screen via the first buffer for display includes: controlling the first service process to start a surfaceflinger process, an OpenGL process and a rendering service process in sequence; and rendering the first image according to the surfaceflinger process, the OpenGL process, the rendering service process and the display parameter of the first buffer.

In some embodiments, the control method for display switching includes: determining a trigger case according to an application requirement; and generating the switching instruction according to the trigger case.

In some embodiments, the trigger case includes a property value and a display parameter, and the property value of the trigger case corresponds to a start service item.

In some embodiments, the initializing the second buffer according to the switching instruction, and controlling the second service process to render the second image according to the display parameter of the second buffer and transmit the rendered second image to the display screen via the second buffer so as to make the display screen switch to displaying the second image includes: transferring, according to the switching instruction, rendering work of a back buffer in the first buffer to a back buffer in the second buffer for rendering; and switching a frame buffer address to the second buffer, and sending the image rendered by the back buffer in the second buffer to a front buffer of the second buffer. the initializing the second buffer according to a switching instruction, and controlling a second service process to render a second image according to a display parameter of the switching instruction and transmit the same to the display screen via the second buffer so that the display screen switches to display the second image includes: transferring back buffer rendering work in the first buffer to the back buffer in the second buffer for rendering according to the switching instruction; and switching a frame buffer address to a second buffer and sending a back buffer rendered image in the second buffer to a front buffer in the second buffer.

In some embodiments, the initializing the second buffer according to the switching instruction, and controlling the second service process to render the second image according to the display parameter of the second buffer and transmit the rendered second image to the display screen via the second buffer so as to make the display screen switch to displaying the second image includes: reinitializing the display screen according to the switching instruction; and transmitting the second image of the front buffer in the second buffer to the display screen for display.

In some embodiments, the control method for display switching includes: controlling the display screen to display the first image according to a first clock unit signal; and switching the first clock unit signal to a second clock unit signal according to the switching instruction to control the display screen to display the second image according to the second clock unit signal.

A control system for display switching provided by embodiments of the present disclosure includes: an initialization module, a first control module and a second control module, where the initialization module is configured to establish a first buffer and a second buffer at a kernel layer and initializing the first buffer; the first control module is configured to establish a first service process and a second service process at a user layer, and control the first service process to render a first image according to a display parameter of the first buffer and transmit the rendered first image to a display screen via the first buffer for display; and the second control module is configured to initialize the second buffer according to a switching instruction, and control the second service process to render a second image according to a display parameter of the second buffer and transmit the rendered second image to the display screen via the second buffer so as to make the display screen switch to displaying the second image.

Embodiments of the present disclosure provide an electronic device, including a processor, a memory, and a program stored on the memory, where the program, when executed by the processor, implements the control method for display switching according to any of the embodiments described above.

Embodiments of the present disclosure provide a non-transitory storage medium having a program stored thereon, where the program, when executed by one or more processors, implements a control method for display switching according to any of the embodiments described above.

For additional aspects and advantages of embodiments of the present disclosure, some of them are provided in the descriptions in the following, and some of them become apparent from the descriptions in the following, or may be learned by practice of the embodiments of the present disclosure.

BRIEF DESCRIPTION OF THE DRAWINGS

The above and/or additional aspects and advantages of the disclosure will become apparent and more readily appreciated from the following descriptions of the embodiments in conjunction with the accompanying drawings.

Figure 1:
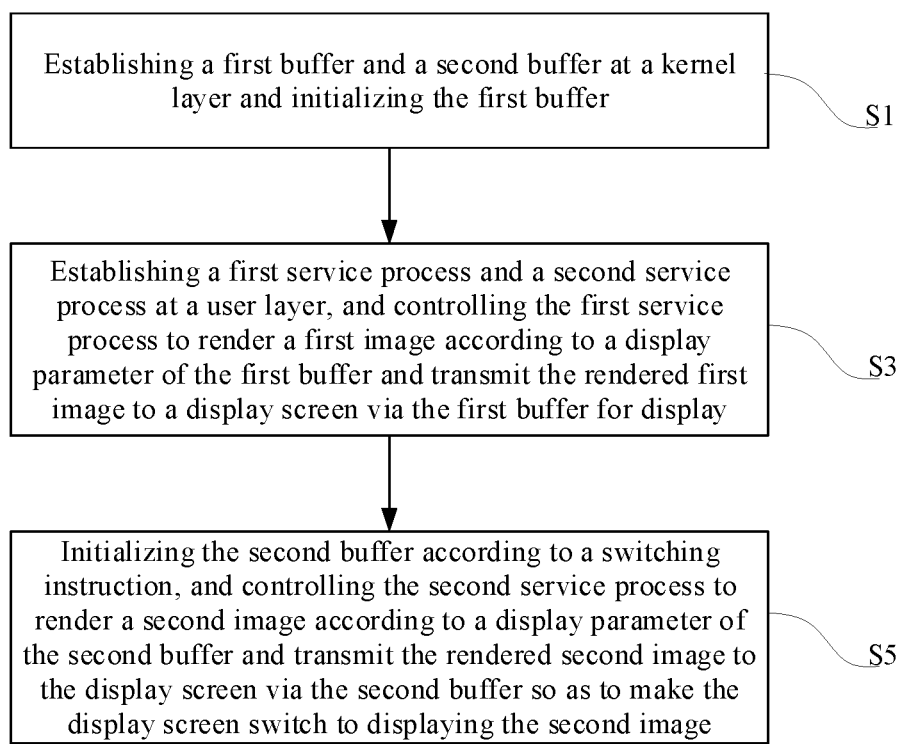
FIG. 1 is a flow chart of a control method for display switching according to some embodiments of the present disclosure.
Figure 2:
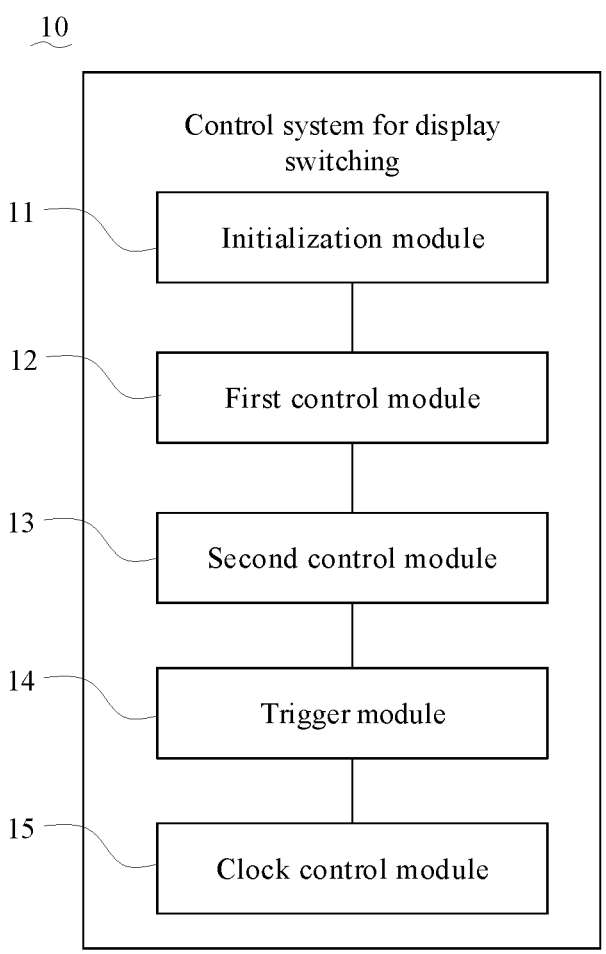
FIG. 2 is a block diagram of a system for display switching according to some embodiments of the present disclosure.
Figure 3:
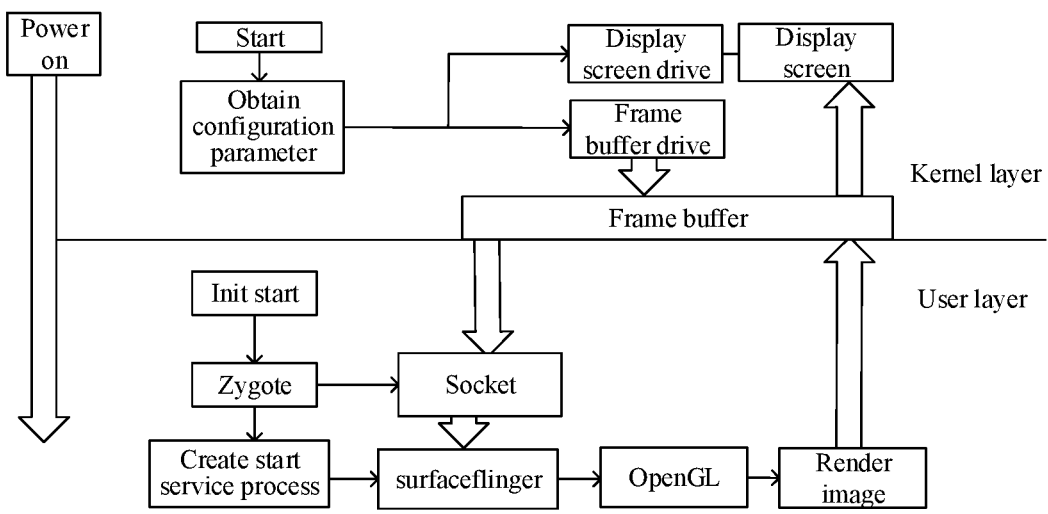
FIG. 3 is a flow chart of normal display of some embodiments of the present disclosure.
Figure 4:
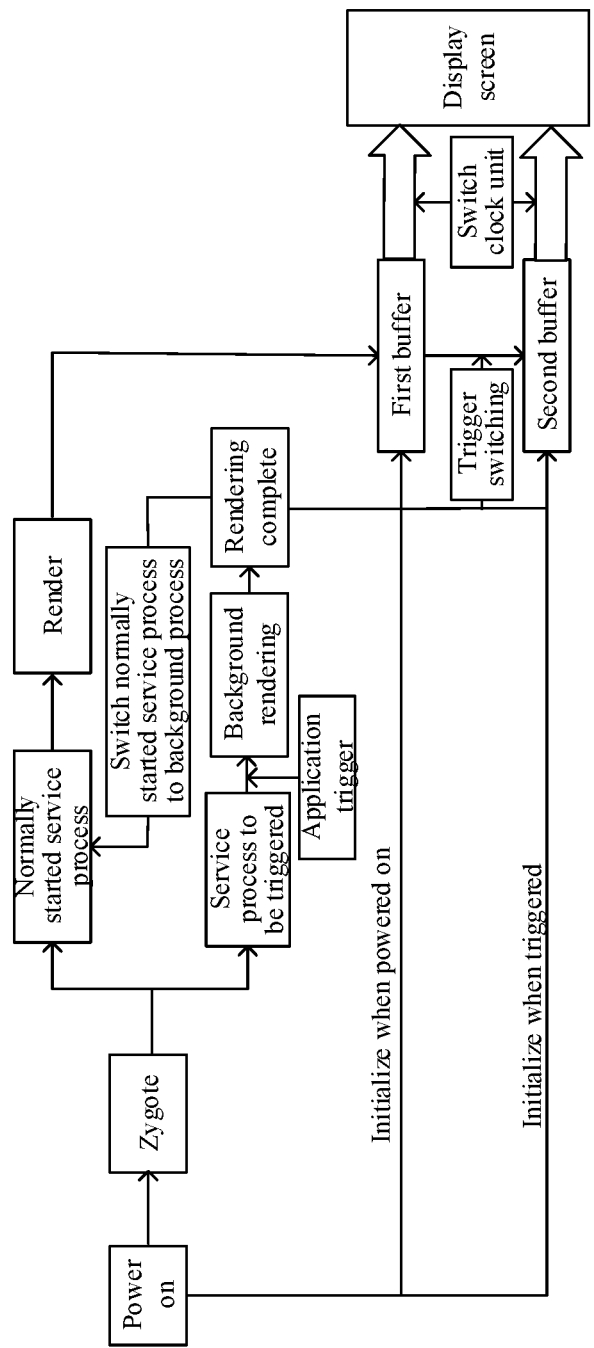
FIG. 4 is a flow chart of display switching according to some embodiments of the present disclosure.
Figure 5:
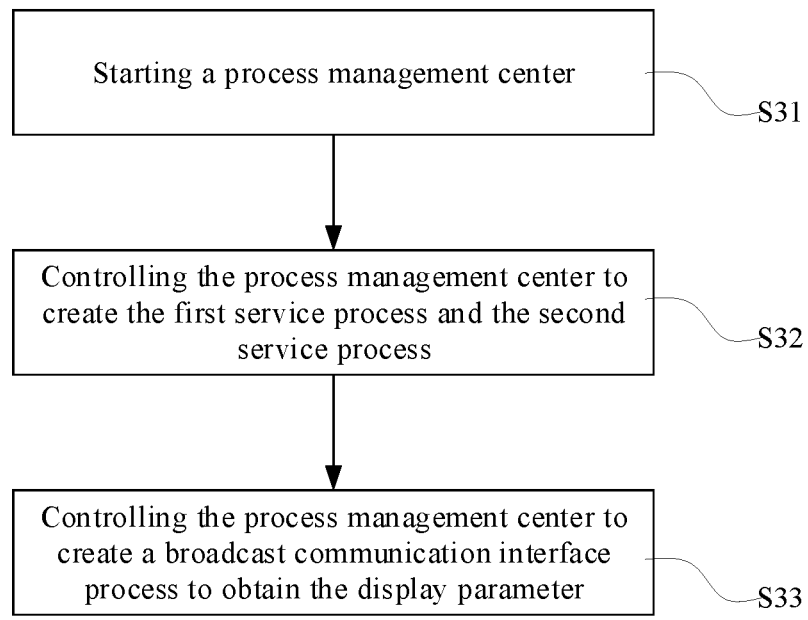
FIG. 5 is another flow chart of a control method for display switching according to some embodiments of the present disclosure.
Figure 6:
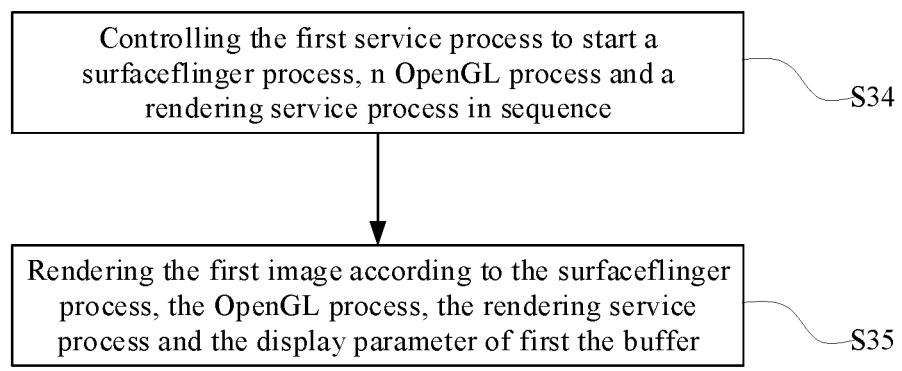
FIG. 6 is another flow chart of a control method for display switching according to some embodiments of the present disclosure.
Figure 7:
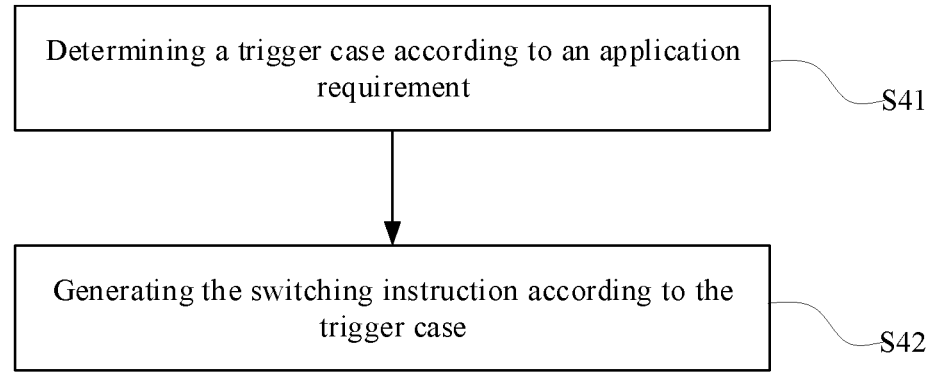
FIG. 7 is another flow chart of a control method for display switching according to some embodiments of the present disclosure.
Figure 8:
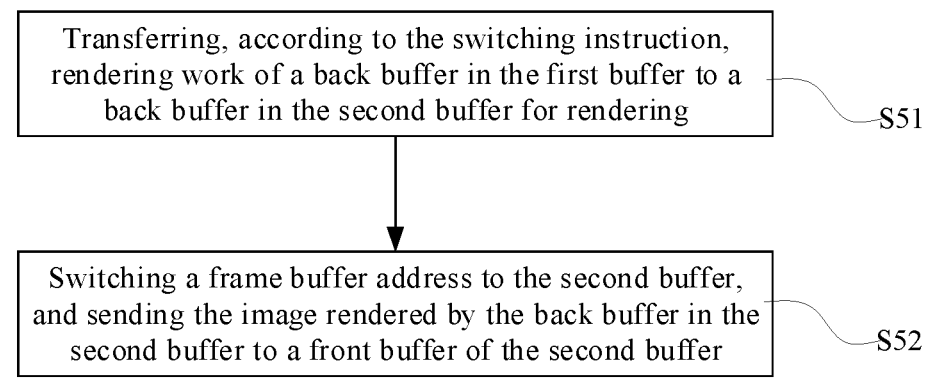
FIG. 8 is another flow chart of a control method for display switching according to some embodiments of the present disclosure.
Figure 9:
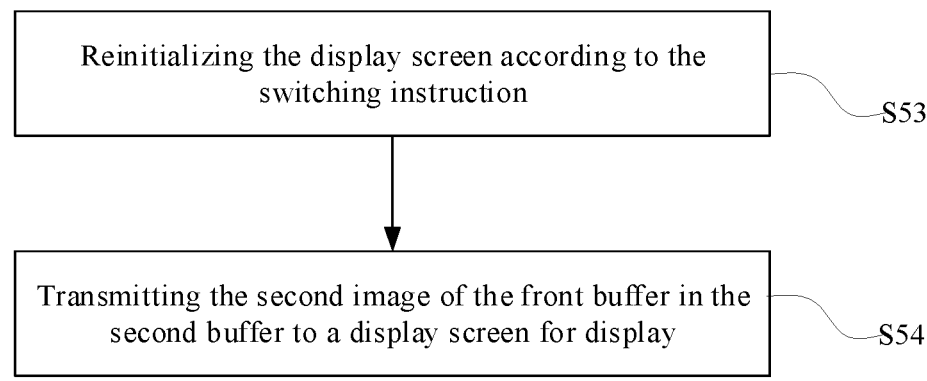
FIG. 9 is another flow chart of a control method for display switching according to some embodiments of the present disclosure.
Figure 10:
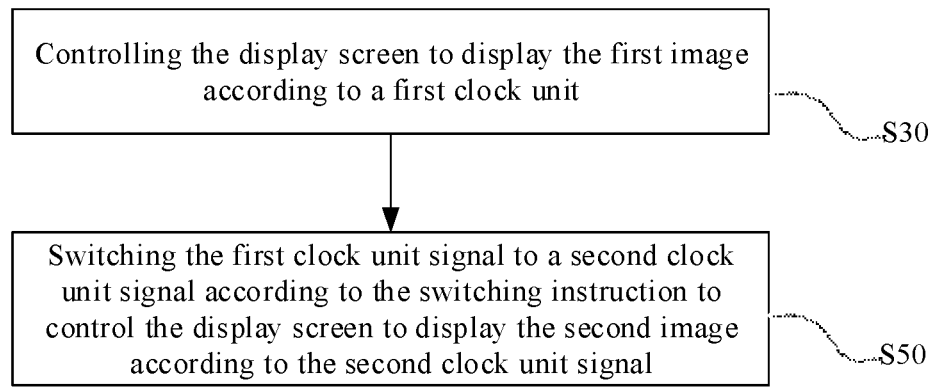
FIG. 10 is another flow chart of a control method for display switching according to some embodiments of the present disclosure.

DESCRIPTION OF MAIN ELEMENT SYMBOLS control system 10 for display switching, initialization module 11, first control module 12, second control module 13, trigger module 14, clock control module 15, electronic device 20, processor 22, memory 24, computer program 242.

DETAILED DESCRIPTION

Hereinafter, embodiments of the present disclosure are described in detail. Examples of the embodiments are shown in the accompanying drawings, where the same or similar reference signs represent the same or similar elements or elements having the same or similar functions. The embodiments described hereinafter with reference to the drawings are exemplary, which are intended to explain the present disclosure and should not be construed as limitation to the present disclosure.

High-definition pictures can bring a good experience to people. However, in the display process, not all pictures need to be displayed with such high definition. Some pictures, such as still scene pictures, do not require very high resolution for support. If all pictures are displayed with the highest standard, resources and powers are wasted.

In a display control scheme based on an Android system, a single frame buffer (a framebuffer) architecture is usually used, and after startup of the system, a frame buffer may be created at a kernel layer as a virtual display card, for providing a window used for drawing at a user layer; after the creation of the frame buffer is completed, the system starts a user layer process, an init process arranges the starting of a thread, to start surfaceflinger and OpenGL in sequence so as to acquire the parameter of the canvas size from the frame buffer and draw on the canvas to realize image rendering, and then transmit the rendered image to a display screen via the frame buffer for display. However, when the display resolution needs to be switched, such a scheme requires restarting the process, reconfiguring the frame buffer and the display screen, which results in the display system not displaying a picture for some time, and cannot realize real-time change of the resolution.

The embodiments of the present disclosure provides a control method for display switching, which is for switching a display resolution. Based on the method, real-time change of a display resolution is realized by means of a double frame buffer, so that a display screen can keep a fluent display of a picture during the display resolution switching process, in this way, an appropriate resolution can be selected for display according to the display requirements of the picture, high definition display is performed when high definition is required, and low definition display is performed when low definition is required, which can save resources while ensuring the normal display of the picture.

The control method for display switching of the embodiments of the present disclosure may be applied to the control system 10 for display switching of the embodiments of the present disclosure, that is, the control system 10 for display switching of the embodiments of the present disclosure may employ the control method for display switching of the embodiments of the present disclosure to realize real-time conversion of display resolution.

In some embodiments, a control method for display switching includes the following steps.

Step S1, establishing a first buffer and a second buffer at a kernel layer and initializing the first buffer.

Step S3, establishing a first service process and a second service process at a user layer, and controlling the first service process to render a first image according to a display parameter of the first buffer and transmit the rendered first image to a display screen via the first buffer for display.

Step S5, initializing the second buffer according to a switching instruction, and controlling the second service process to render a second image according to a display parameter of the second buffer and transmit the rendered second image to the display screen via the second buffer so as to make the display screen switch to displaying the second image.

In some embodiments of the present disclosure, the initializing the second buffer according to the switching instruction may include: determining the display parameter of the second buffer according to an indicator in the switching instruction, and transferring the display parameter to the second buffer. The indicator is associated with the display parameter to the second buffer.

Accordingly, the control system 10 for display switching includes an initialization module 11, a first control module 12 and a second control module 13, where step S1 may be realized by the initialization module 11, step S3 may be realized by the first control module 12 and step S5 may be realized by the second control module 13. That is, the initialization module 11 may be configured to establish a first buffer and a second buffer at a kernel layer and initialize the first buffer. The first control module 12 may be configured to establish a first service process and a second service process at a user layer, and control the first service process to render a first image according to a display parameter of the first buffer and transmit it to a display screen via the first buffer for display. The second control module 13 is configured to initialize the second buffer according to a switching instruction, and control the second service process to render a second image according to a display parameter of the second buffer and transmit it to the display screen via the second buffer so as to make the display screen switch to displaying the second image.

In the control method for display switching and the control system 10 for display switching of the embodiments of the present disclosure, a boot process of a system boot loader (bootloader) is modified; when booting up, by the booting of the system boot loader, two frame buffers (i.e., a first buffer and a second buffer) are created at a kernel layer at the same time, the first buffer is used as a main frame buffer (main framebuffer) for initialization, and then service processes corresponding to the two frame buffers are established at a user layer; where the first service process starts with the system, the second service process starts when an application triggers a change to generate a switching instruction, initializes the second buffer and renders a second image, and controls the display screen to switch to displaying the second image after the second image is rendered.

It should be noted that after the first buffer and the second buffer are established, two kernel addresses are respectively assigned to the two frame buffers, for example, the address of the first buffer may be 0x00001e, and the address of the second buffer may be 0x00001f.

Further, when the second service process starts, the system performs a double thread operation. In this case, the process of initializing the second buffer and rendering the second image may be performed in the background, and the change of the display screen configuration may be triggered after the rendering of the second image is completed so as to output the second image, so that the first image and the second image can be seamlessly switched. For example, if the resolution of the first image and the resolution of the second image are different, the application may trigger a resolution switching instruction to switch the first image displayed on the display screen to the second image so as to achieve a real-time conversion of the resolution.

In some embodiments, step S3 may include the following steps.

Step S31, starting a process management center.

Step S32, controlling the process management center to create the first service process and the second service process.

Step S33, controlling the process management center to create a broadcast communication interface process to obtain the display parameter.

Specifically, step S31, step S32 and step S33 may be realized by the first control module 12, that is to say, the first control module 12 may be configured to start a process management center; configured to control the process management center to create the first service process and the second service process, and cause the process to be triggered to enter the background for running; and configured to control the process management center to create a broadcast communication interface process to obtain the display parameter.

For an Android system, apart from the system boot process and the init process, etc., most processes are created by the process management center (Zygote). The process management center is started and the first service process and the second service process are created, where the first service process is a normally started service process, and the first service process may be started with the system to realize the drawing and rendering of the first image together with the first buffer; the second service process is a service process to be triggered, and the second service process may be started when an application triggers a corresponding case to generate a switching instruction so as to realize the drawing and rendering of the second image together with the second buffer.

In step S33, the created communication interface process is a Socket broadcast communication interface process, and the Socket broadcast communication interface process may be used for monitoring and reporting data conversion in the interface in real time. After the first service process starts, the display parameter matched with the first buffer is read via the socket broadcast communication interface process.

In some embodiments, step S3 may include the following steps.

Step S34, controlling the first service process to start a surfaceflinger process, an OpenGL process and a rendering service process in sequence.

Step S35, rendering the first image according to the surfaceflinger process, the OpenGL process, the rendering service process and the display parameter of the first buffer.

Specifically, steps S34 and S35 may be implemented by the first control module 12, i.e., the first control module 12 may be configured to control the first service process to start a surfaceflinger process, an OpenGL process and a rendering service process in sequence, and configured to render the first image according to the display parameter of the first buffer through the surfaceflinger process, the OpenGL process and the rendering service process.

In this way, the display of the first image can be achieved through the display screen, by creating the surfaceflinger process, creating a texture through the OpenGL process, cyclically drawing the first image on the surface object, and then rendering it into the first buffer through the rendering service process. Specifically, the surfaceflinger process and the OpenGL process are equivalent to a painter, a brush and a canvas of a display system for rendering an image, and the display parameter may be read from a first display frame of the kernel layer by the Socket broadcast communication interface process to specify the size of the canvas.

In some embodiments, the control method for display switching may include the following steps.

Step S41, determining a trigger case according to an application requirement.

Step S42, generating the switching instruction according to the trigger case.

The trigger case includes a property value and a display parameter, and the property value of the trigger case corresponds to a start service item.

Specifically, the control system 10 for display switching includes a trigger module 14, and steps S41 and S42 may be implemented by the trigger module 14. That is, the triggering module 14 may be configured to determine a trigger case based on an application requirement and generate the switching instruction based on the trigger case.

It can be appreciated that when the application of the user layer requires resolution switching, different display parameters may be selected according to the target resolution that is to be switched to, so that multiple trigger cases may be set. For the user layer, different trigger cases are configured with different property values, which correspond to different service start items. For the kernel layer, different trigger cases may correspond to different display parameters. When the user layer confirms the trigger case, the user layer and the kernel layer of the whole system may perform trigger case matching and parameter initialization, and generate the corresponding switching instruction.

In some examples, the trigger cases may include, for example, three cases, and the display resolutions for the three cases may be, for example 3840×2160@60 Hz, 1920×1080@90 Hz, 1280×720@120 Hz, respectively. The parameters of the three cases may be written into the system source code, including the system layer and the bottom layer; the cases to be triggered at the system layer have different property values, which may be respectively set as a resolution property 0, a resolution property 1 and a resolution property 2; then the bottom layer needs to configure three corresponding cases, which may be configured as case 0: resolution=3840×2160@60 Hz, case1: resolution=1920×1080@90 Hz, case2: resolution=1280×720@120 Hz. The trigger cases may include other parameters, which are not specifically limited herein.

For example, it is assumed that the current display resolution is 3840×2160@60 Hz; if an application at the user layer needs to perform resolution switching, an instruction may be issued; the instruction may include an indicator, for example, including a serial number of a case (such as trigger case 1); in this case, this instruction may trigger the service process to be triggered. After processings such as matching and initialization configuration, the display screen may finally output an image of 1920×1080@90 Hz.

In some embodiments, step S5 may include the following steps.

Step S51, transferring, according to the switching instruction, rendering work of a back buffer in the first buffer to a back buffer in the second buffer for rendering.

Step S52, switching a frame buffer address to the second buffer, and sending the image rendered by the back buffer in the second buffer to a front buffer of the second buffer.

Specifically, steps S51 and S52 may be implemented by the second control module 13. That is to say, the second control module 13 may be used for transferring, according to the switching instruction, rendering work of a back buffer in the first buffer to a back buffer in the second buffer for rendering, and used for switching a main frame buffer address to the second buffer, and sending the image rendered by the back buffer in the second buffer to a front buffer of the second buffer.

In step S51, the second control module 13 may start the already created second service process, and make the second service process enter the background for running; after the second service process is started, a surfaceflinger process may be newly created, and then the surfaceflinger process may start a new OpenGL; at the same time, the display parameter matched with the trigger case is read via the socket broadcast communication interface process, and the initialization configuration of the canvas size of the OpenGL process is completed. In addition, the socket broadcast communication interface process may transfer the trigger case to the kernel layer; the kernel layer performs trigger case matching so as to assign the parameter in the trigger case to the frame buffer drive; the frame buffer drive may perform initialization configuration on the second buffer and configure a window with a size of a new parameter.

After the initialization at the bottom layer and the user layer is completed, the vsync signal is reported, and the system transfers the rendering work of the back buffer (back_frame buffer) in the first buffer to the back buffer in the second buffer for rendering.

In step S52, after the rendering of the back buffer of the second buffer is completed, the kernel layer may switch the address of the main frame buffer to the address of the second buffer; in addition, the rendered second image is sent to a front buffer (front frame buffer) of the second buffer, and a vsync signal is reported to the bottom layer so as to control the bottom layer to display the second image.

In some embodiments, step S5 may include the following steps.

Step S53, reinitializing the display screen according to the switching instruction.

Step S54, transmitting the second image of the front buffer in the second buffer to a display screen for display.

In particular, steps S53 and S54 may be implemented by the second control module 13. That is, the second control module 13 may be used for reinitializing the display screen according to the switching instruction, and used for transmitting the second image of the front buffer in the second buffer to the display screen for display.

It should be noted that the display screen of the embodiments of the present disclosure may be a display screen that supports a non-black screen initialization operation when powered up. In this way, after receiving the vsync signal, the bottom layer triggers the previously matched trigger case and reinitializes the display screen, and then sends the second image rendered by the front buffer in the second buffer to the display screen for display.

In some embodiments, the control method for display switching may include the following steps.

Step S30, controlling the display screen to display the first image according to a first clock unit signal.

Step S50, switching the first clock unit signal to a second clock unit signal according to the switching instruction to control the display screen to display the second image according to the second clock unit signal.

Specifically, the control system 10 for display switching includes a clock control module 15, and step S30 and step S50 may be implemented by the clock control module 15. That is, the clock control module 15 may be used for controlling the display screen to display the first image according to a first clock unit signal, and used for switching the first clock unit signal to a second clock unit signal according to the switching instruction to control the display screen to display the second image according to the second clock unit signal.

When the resolution is switched by the bottom layer, the support of a clock unit is required. In the embodiments of the present disclosure, by means of a dual clock unit configuration, a clock unit is added, and this clock unit is started when display switching control is required, and is paused when display switching control is not required.

The above descriptions show embodiments of switching from the first buffer to the second buffer, and switching from the second buffer to the first buffer may be performed according to the present disclosure when the switch is needed again. It will be understood that the switch from the second buffer to the first buffer may be similar to the switch from the first buffer to the second buffer, which is not described in detail herein.

Figure 11:
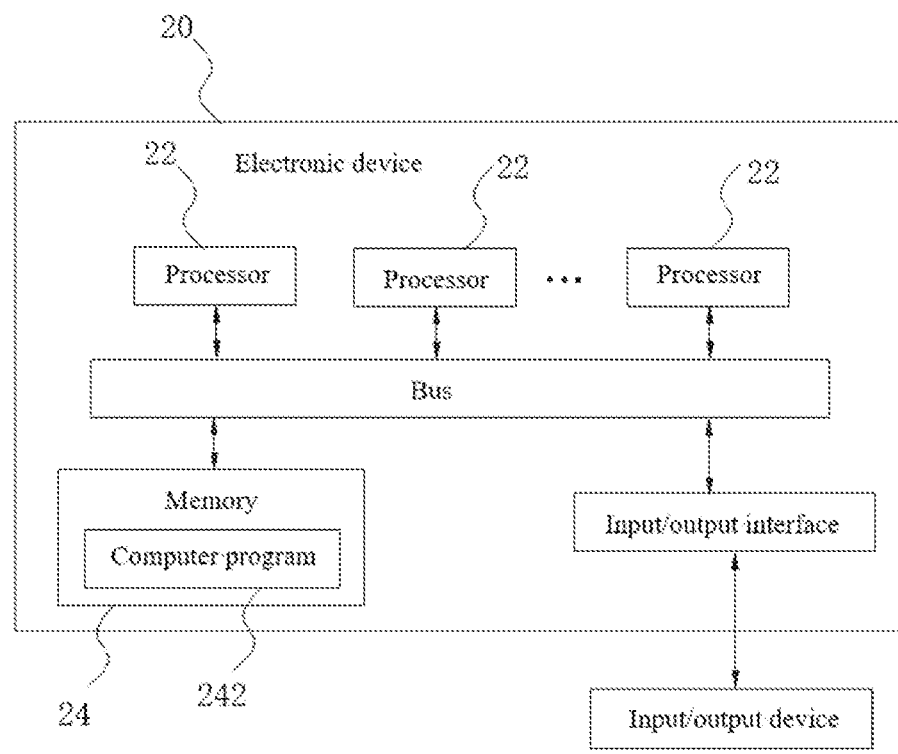
FIG. 11 is a structural diagram of an electronic device according to some embodiments of the present disclosure.

With reference to FIG. 11, some embodiments of the present disclosure provide an electronic device 20, including a processor 22, a memory 24 and a computer program 242 stored in the memory 24, where the computer program 242, when executed by the processor 22, may implement the control method for display switching according to any of the above embodiments and can achieve the same technical effects, which is not described in detail herein to avoid repetition.

In some examples, the computer program 242, when executed by processor 22, performs the following steps.

Step S1, establishing a first buffer and a second buffer at a kernel layer and initializing the first buffer.

Step S3, establishing a first service process and a second service process at a user layer, and controlling the first service process to render a first image according to a display parameter of the first buffer and transmit the rendered first image to a display screen via the first buffer for display.

Step S5, initializing the second buffer according to a switching instruction, and controlling the second service process to render a second image according to a display parameter of the second buffer and transmit the rendered second image to the display screen via the second buffer so as to make the display screen switch to displaying the second image.

In the electronic device 20 of the embodiments of the present disclosure, the computer program 242 is executed by the processor 22; a boot process of a system boot loader is modified; when booting up, by the booting of the system boot loader, two frame buffers are created at a kernel layer at the same time, the first buffer is used as a main frame buffer for initialization, and then service processes corresponding to the two frame buffers are established at a user layer; where the first service process starts with the system, the second service process starts when an application triggers a change to generate a switching instruction, initializes the second buffer and renders a second image, and controls the display screen to switch to displaying the second image after the second image is rendered.

In particular, the one or more processors 22 may be coupled via a bus to the memory 24, and the memory 24 stores the computer program 242. The one or more processors 22, when executing the computer program, may be configured to perform the control method for display switching of embodiments of the present disclosure, which can realize real-time conversion of display resolution. The electronic device 20 may be connected to the display screen through an input/output interface to display a corresponding image.

In some embodiments, the electronic device includes, but is not limited to, a mobile phone, a tablet computer, a notebook computer, a palmtop computer, a vehicle-mounted terminal, a wearable device, or a pedometer, etc., which are not limited by the present disclosure.

Some embodiments of the present disclosure provide a readable storage medium storing a computer program, and the computer program, when executed by one or more processors, can implement the control method for display switching of any of the above embodiments and can achieve the same technical effects, which is not described in detail herein to avoid repetition.

In the control method for display switching, the control system for display switching, the electronic device and the storage medium of the embodiments of the present disclosure, a boot process of a system boot loader is modified; when booting up, by the booting of the system boot loader, two frame buffers are created at a kernel layer at the same time, the first buffer is used as a main frame buffer for initialization, and then service processes corresponding to the two frame buffers are established at a user layer; where the first service process starts with the system, the second service process starts when an application triggers a change to generate a switching instruction, initializes the second buffer and renders a second image, and controls the display screen to switch to displaying the second image after the second image is rendered.

In the descriptions of the specification, the descriptions with reference to the terms such as "one embodiment", "some embodiments" or "an example" mean that specific features, structures, materials, or characteristics described in conjunction with the embodiments or examples are included in at least one embodiment or example of the present disclosure. In the specification, the schematic expressions of the above terms are not necessarily directed to the same embodiment or example. Furthermore, the specific features, structures, materials, or characteristics as described may be combined in any suitable manner in any one or more embodiments or examples.

Any process or method description in a flowchart or otherwise described herein may be understood to represent a module, segment, or portion of code including one or more executable instructions for implementing steps of a customized logic function or process, and the scope of embodiments of the present disclosure includes additional implementations that may perform functions in a substantially simultaneous manner, or in a reverse order, depending on the functionality involved, out of the order shown or discussed, as would be understood by those skilled in the art to which embodiments of the present disclosure pertain.

The logic and/or steps represented in the flowchart or otherwise described herein, e.g., as a ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this specification, a "computer-readable medium" can be any means that can contain, store, communicate, propagate, or transport the program for use by or in connection with the instruction execution system, apparatus, or device. More specific examples (a non-exhaustive list) of the computer-readable medium include the following: an electrical connection (electronic device) having one or more wires, a portable computer disk cartridge (magnetic device), a random access memory (RAM), a read-only memory (ROM), an erasable programmable read-only memory (EPROM or Flash memory), an optical fiber device, and a portable compact disc read-only memory (CDROM). In addition, the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should be understood that portions of the present disclosure may be implemented in hardware, software, firmware, or a combination thereof. In the embodiments described above, the steps or methods may be implemented in software or firmware stored in memory and executed by a suitable instruction execution system. For example, if implemented in hardware as in another embodiment, it may be implemented using any one or combination of the following techniques known in the art: a discrete logic circuit having logic gates for implementing logic functions on data signals, an application specific integrated circuit having appropriate combinational logic gates, a programmable gate array (PGA), a field programmable gate array (FPGA), etc.

It will be appreciated by those of ordinary skill in the art that all or a portion of the steps carried out by the methods of the embodiments described above can be performed by hardware associated with a program stored in a computer readable storage medium that when executed includes one or a combination of the steps of the method embodiments.

Furthermore, the functional units in the various embodiments of the present disclosure may be integrated into one processing module, may be physically present individually for each unit, or may be integrated into one module for two or more units. The above-mentioned integrated modules can be implemented in the form of hardware or in the form of software functional modules. The integrated modules, if implemented as software functional modules and sold or used as stand-alone products, may also be stored in a computer-readable storage medium. The storage medium mentioned above may be a read-only memory, a magnetic or optical disk, etc.

The embodiments of the present disclosure are shown and described in the above, and it can be understood that the above embodiments are exemplary and should not be construed as limitation to the present disclosure. Changes, modifications, substitutions, and variants can be made to the above embodiments by those skilled in the art without departing from the scope of the present disclosure.

What is claimed is:

1. A control method for display switching, comprising:
   establishing a first buffer and a second buffer at a kernel layer based on an Android system and initializing the first buffer;
   establishing a first service process and a second service process at a user layer based on the Android system, and controlling the first service process to render a first image according to a display parameter of the first buffer and transmit the rendered first image to a display screen via the first buffer for display; and
   initializing the second buffer according to a switching instruction, and controlling the second service process to render a second image according to a display parameter of the second buffer and transmit the rendered second image to the display screen via the second buffer so as to make the display screen switch to displaying the second image;
   wherein the display parameter of the first buffer is different from the display parameter of the second buffer, and the display parameter of the first buffer and the display parameter of the second buffer comprise resolution;
   the control method for display switching further comprises:
   determining a trigger case according to an application requirement; and
   generating the switching instruction according to the trigger case;
   different trigger cases corresponds to different display parameters; and
   the initializing the second buffer according to the switching instruction comprises:
   determining the display parameter of the second buffer according to an indicator in the switching instruction, and transferring the display parameter to the second buffer.

2. The control method for display switching according to claim 1, wherein the establishing the first service process and the second service process at the user layer, and controlling the first service process to render the first image according to the display parameter of the first buffer and transmit the rendered first image to the display screen via the first buffer for display comprises:
   starting a process management center;
   controlling the process management center to create the first service process and the second service process; and
   controlling the process management center to create a broadcast communication interface process to obtain the display parameter.

3. The control method for display switching according to claim 2, wherein the establishing the first service process and the second service process at the user layer, and controlling the first service process to render the first image according to the display parameter of the first buffer and transmit the rendered first image to the display screen via the first buffer for display comprises:
   controlling the first service process to start a surfaceflinger process, an OpenGL process and a rendering service process in sequence; and
   rendering the first image according to the surfaceflinger process, the OpenGL process, the rendering service process and the display parameter of the first buffer.

4. The control method for display switching according to claim 1, wherein the trigger case comprises a property value and a display parameter, and the property value of the trigger case corresponds to a start service item.

5. The control method for display switching according to claim 1, wherein the initializing the second buffer according to the switching instruction, and controlling the second service process to render the second image according to the display parameter of the second buffer and transmit the rendered second image to the display screen via the second buffer so as to make the display screen switch to displaying the second image comprises:
   transferring, according to the switching instruction, rendering work of a back buffer in the first buffer to a back buffer in the second buffer for rendering; and
   switching a frame buffer address to the second buffer, and sending the image rendered by the back buffer in the second buffer to a front buffer of the second buffer.

6. The control method for display switching according to claim 5, wherein the initializing the second buffer according to the switching instruction, and controlling the second service process to render the second image according to the display parameter of the second buffer and transmit the rendered second image to the display screen via the second buffer so as to make the display screen switch to displaying the second image comprises:
   reinitializing the display screen according to the switching instruction; and
   transmitting the second image of the front buffer in the second buffer to the display screen for display.

7. The control method for display switching according to claim 1, further comprising:
controlling the display screen to display the first image according to a first clock unit signal; and
switching the first clock unit signal to a second clock unit signal according to the switching instruction to control the display screen to display the second image according to the second clock unit signal.

8. An electronic device, comprising a processor, a memory, and a program stored on the memory, wherein the program, when executed by the processor, implements a control method for display switching, and the control method for display switching comprises:
establishing a first buffer and a second buffer at a kernel layer based on an Android system and initializing the first buffer;
establishing a first service process and a second service process at a user layer based on the Android system, and controlling the first service process to render a first image according to a display parameter of the first buffer and transmit the rendered first image to a display screen via the first buffer for display; and
initializing the second buffer according to a switching instruction, and controlling the second service process to render a second image according to a display parameter of the second buffer and transmit the rendered second image to the display screen via the second buffer so as to make the display screen switch to displaying the second image;
wherein the display parameter of the first buffer is different from the display parameter of the second buffer, and the display parameter of the first buffer and the display parameter of the second buffer comprise resolution;
the control method for display switching further comprises:
determining a trigger case according to an application requirement; and
generating the switching instruction according to the trigger case;
different trigger cases corresponds to different display parameters; and
the initializing the second buffer according to the switching instruction comprises:
determining the display parameter of the second buffer according to an indicator in the switching instruction, and transferring the display parameter to the second buffer.

9. The electronic device according to claim 8, wherein the establishing the first service process and the second service process at the user layer, and controlling the first service process to render the first image according to the display parameter of the first buffer and transmit the rendered first image to the display screen via the first buffer for display comprises:
starting a process management center;
controlling the process management center to create the first service process and the second service process; and
controlling the process management center to create a broadcast communication interface process to obtain the display parameter.

10. The electronic device according to claim 9, wherein the establishing the first service process and the second service process at the user layer, and controlling the first service process to render the first image according to the display parameter of the first buffer and transmit the rendered first image to the display screen via the first buffer for display comprises:
controlling the first service process to start a surfaceflinger process, an OpenGL process and a rendering service process in sequence; and
rendering the first image according to the surfaceflinger process, the OpenGL process, the rendering service process and the display parameter of the first buffer.

11. The electronic device according to claim 8, wherein the trigger case comprises a property value and a display parameter, and the property value of the trigger case corresponds to a start service item.

12. The electronic device according to claim 8, wherein the initializing the second buffer according to the switching instruction, and controlling the second service process to render the second image according to the display parameter of the second buffer and transmit the rendered second image to the display screen via the second buffer so as to make the display screen switch to displaying the second image comprises:
transferring, according to the switching instruction, rendering work of a back buffer in the first buffer to a back buffer in the second buffer for rendering; and
switching a frame buffer address to the second buffer, and sending the image rendered by the back buffer in the second buffer to a front buffer of the second buffer.

13. The electronic device according to claim 12, wherein the initializing the second buffer according to the switching instruction, and controlling the second service process to render the second image according to the display parameter of the second buffer and transmit the rendered second image to the display screen via the second buffer so as to make the display screen switch to displaying the second image comprises:
reinitializing the display screen according to the switching instruction; and
transmitting the second image of the front buffer in the second buffer to the display screen for display.

14. The electronic device according to claim 8, wherein the control method for display switching further comprises:
controlling the display screen to display the first image according to a first clock unit signal; and
switching the first clock unit signal to a second clock unit signal according to the switching instruction to control the display screen to display the second image according to the second clock unit signal.

15. A non-transitory storage medium, having a program stored thereon, wherein the program, when executed by one or more processors, implements a control method for display switching, and the control method for display switching comprises:
establishing a first buffer and a second buffer at a kernel layer based on an Android system and initializing the first buffer;
establishing a first service process and a second service process at a user layer based on the Android system, and controlling the first service process to render a first image according to a display parameter of the first buffer and transmit the rendered first image to a display screen via the first buffer for display; and
initializing the second buffer according to a switching instruction, and controlling the second service process to render a second image according to a display parameter of the second buffer and transmit the rendered second image to the display screen via the second buffer so as to make the display screen switch to displaying the second image;
wherein the display parameter of the first buffer is different from the display parameter of the second buffer, and the display parameter of the first buffer and the display parameter of the second buffer comprise resolution;

the control method for display switching further comprises:

determining a trigger case according to an application requirement; and generating the switching instruction according to the trigger case;

different trigger cases corresponds to different display parameters; and the initializing the second buffer according to the switching instruction comprises:

determining the display parameter of the second buffer according to an indicator in the switching instruction, and transferring the display parameter to the second buffer.

16. The non-transitory storage medium according to claim 15, wherein the establishing the first service process and the second service process at the user layer, and controlling the first service process to render the first image according to the display parameter of the first buffer and transmit the rendered first image to the display screen via the first buffer for display comprises:

starting a process management center;

controlling the process management center to create the first service process and the second service process; and controlling the process management center to create a broadcast communication interface process to obtain the display parameter.

17. The non-transitory storage medium according to claim 16, wherein the establishing the first service process and the second service process at the user layer, and controlling the first service process to render the first image according to the display parameter of the first buffer and transmit the rendered first image to the display screen via the first buffer for display comprises:

controlling the first service process to start a surfaceflinger process, an OpenGL process and a rendering service process in sequence; and rendering the first image according to the surfaceflinger process, the OpenGL process, the rendering service process and the display parameter of the first buffer.

\* \* \* \* \*